US011151412B2

United States Patent
Teichner et al.

(10) Patent No.: US 11,151,412 B2
(45) Date of Patent: Oct. 19, 2021

(54) SYSTEMS AND METHODS FOR DETERMINING ACTIONS PERFORMED BY OBJECTS WITHIN IMAGES

(71) Applicant: Everseen Limited, Blackpool (IE)

(72) Inventors: Michael Teichner, Timisoara (RO); Bogdan Ciubotaru, Donoughmore (IE)

(73) Assignee: Everseen Limited, Blackpool (IE)

( * ) Notice: Subject to any disclaimer, the term of this patent is extended or adjusted under 35 U.S.C. 154(b) by 204 days.

(21) Appl. No.: 16/458,286

(22) Filed: Jul. 1, 2019

(65) Prior Publication Data

US 2021/0004641 A1    Jan. 7, 2021

(51) Int. Cl.
*G06K 9/62* (2006.01)
*G06K 9/00* (2006.01)

(52) U.S. Cl.
CPC ....... *G06K 9/6229* (2013.01); *G06K 9/00335* (2013.01); *G06K 9/628* (2013.01)

(58) Field of Classification Search
CPC .. G06K 9/6229; G06K 9/00335; G06K 9/628; G06K 9/6267; G06K 9/4628; G06K 9/00718; G06K 9/6218; G06K 9/627; G06K 9/3241; G06K 9/46; G06K 9/4671; G06K 9/00067; G06K 9/00087; G06K 9/00288; G06K 9/00369; G06K 9/00382; G06K 9/00389; G06K 9/00684; G06K 9/00744; G06N 3/08; G06N 3/0454; G06N 3/084; G06N 3/0481; G06N 7/005; G06N 20/10; G06N 20/00; G06N 20/20; G06T 2207/20084; G06T 2207/20081; G06T 3/4046; G06T 7/70
See application file for complete search history.

(56) References Cited

U.S. PATENT DOCUMENTS

| | | | | |
|---|---|---|---|---|
| 10,423,861 B2* | 9/2019 | Gao | ...................... | G06K 9/6257 |
| 10,558,915 B2* | 2/2020 | Gao | ...................... | G06N 3/0454 |
| 10,559,111 B2* | 2/2020 | Sachs | ........................ | G06T 7/13 |
| 10,691,980 B1* | 6/2020 | Guendel | ............. | G06K 9/4628 |
| 10,692,244 B2* | 6/2020 | Gu | ........................ | G06K 9/4628 |

(Continued)

OTHER PUBLICATIONS

Christoph Feichtenhofer et al: "Spatiotemporal Residual Networks for Video Action Recognition", arxiv.org, Cornell University Library, 201 Olin Library Cornell University Ithaca, NY 14853, Nov. 7, 2016 (Nov. 7, 2016), XP080729980.

(Continued)

*Primary Examiner* — Manav Seth

(57) ABSTRACT

A system for determining an action performed within an input image includes a memory to store one or more instructions, and a processor communicatively coupled to the memory, and configured to execute the one or more instructions in the memory. The processor employs a convolutional neural network (CNN) that includes a predefined number of initial stages for extracting one or more significant features corresponding to the input image, wherein each initial stage includes a first layer, and a residual block, and wherein the first layer is selected from a group consisting of a convolution layer, a max pooling layer, and an average pooling layer. The CNN includes a final stage for classifying the extracted significant features into one or more predefined classes, wherein the final stage is formed of a global average pooling layer, and a dense layer.

15 Claims, 4 Drawing Sheets

(56) References Cited

U.S. PATENT DOCUMENTS

| | | | |
|---|---|---|---|
| 10,706,350 B1* | 7/2020 | Tran | G06N 3/08 |
| 10,867,184 B2* | 12/2020 | Choutas | G06K 9/00718 |
| 10,873,456 B1* | 12/2020 | Dods | H04L 9/3239 |
| 2017/0255832 A1* | 9/2017 | Jones | G06N 3/0454 |
| 2019/0114391 A1* | 4/2019 | Jaganathan | G06K 9/6267 |
| 2019/0171936 A1* | 6/2019 | Karras | G06N 3/0454 |
| 2019/0220704 A1* | 7/2019 | Schulz-Trieglaff | G16B 20/20 |
| 2019/0236440 A1* | 8/2019 | Ho | G06F 17/12 |
| 2019/0279074 A1* | 9/2019 | Lin | G06F 16/5854 |
| 2019/0341052 A1* | 11/2019 | Allibhai | G10L 15/22 |
| 2019/0370972 A1* | 12/2019 | Bagci | G06T 7/11 |
| 2019/0377930 A1* | 12/2019 | Chen | G06K 9/6262 |
| 2020/0026942 A1* | 1/2020 | Jiang | G06N 3/04 |
| 2020/0086879 A1* | 3/2020 | Lakshmi Narayanan | G06N 3/0445 |
| 2020/0170564 A1* | 6/2020 | Jiang | G06K 9/4628 |
| 2020/0210767 A1* | 7/2020 | Do | G06N 3/08 |
| 2020/0234482 A1* | 7/2020 | Krokhalev | G06K 9/00261 |
| 2020/0265219 A1* | 8/2020 | Liu | G06K 9/00288 |
| 2020/0356767 A1* | 11/2020 | Yang | G06K 9/4623 |
| 2020/0372246 A1* | 11/2020 | Chidananda | G06F 3/017 |

OTHER PUBLICATIONS

Dongfeng Gu: "3D Densely Connected Convolutional Network for the Recognition of Human Shopping Actions", 2017, XP055713578, DOI: 10.20381/ruor-21013 Retrieved from the Internet: URL: https://ruor.uottawa.ca/bitstream/10393/36739/1/Gu_Dongfeng_2017_thesis.pdf.

* cited by examiner

SYSTEMS AND METHODS FOR DETERMINING ACTIONS PERFORMED BY OBJECTS WITHIN IMAGES

TECHNICAL FIELD

The present disclosure relates generally to artificial intelligence; and more specifically, to systems and methods for determining actions performed by objects within images. Furthermore, the present disclosure relates to software products recorded on machine-readable non-transient data storage media, wherein the software products are executable upon computing hardware to implement the aforementioned methods for determining actions performed by objects within images.

BACKGROUND

Generally, with improvement in technology, computers are finding increased usage in day-to-day lives of people. This does not just include usage of the computers for personal computing applications, including but not limited to, use of computers in the field of communication, education, service industry and so forth, but also for other commercial and non-commercial purposes that concern social benefit. Such uses of the computer can include, for example, defense, medicine, scientific research and so forth. Specifically, the computing areas that are finding increased usage in the aforementioned fields are artificial intelligence, machine-learning and machine-vision.

For example, in the field of automated driving systems (such as, self-driving cars), machine-vision and artificial intelligence is being employed for detection of objects around a vehicle capable of automated driving, thereby, allowing the vehicle to safely, conveniently and reliably navigate around the objects. In another example, devices having sensors capable of detecting and identifying movement of people are being increasingly used in defense applications, such as, around border-regions of countries. Such devices employ machine-vision and artificial intelligence therein to detect potential threat that may be associated with people who may be unlawfully infiltrating international border of a country.

Usually, the aforementioned artificial intelligence, machine-learning and machine-vision systems are used not only for detecting presence of objects (such as a humans or animals) within an environment, but also for identifying actions performed by the objects within the environment. For example, the artificial intelligence systems may employ a convolutional neural network for identifying the actions performed by the objects. However, such a convolutional neural network may require a different number of filters based on a usage thereof, or a plurality of redundant layers, thereby, making the determination of actions associated with the objects slow and ineffective.

Therefore, in light of the foregoing discussion, there exists a need to overcome the drawbacks associated with conventional artificial intelligence systems employing convolutional neural networks, for identifying actions performed by objects in an environment.

SUMMARY

The present disclosure seeks to provide an improved system for determining an action performed by an object within an input image.

Furthermore, the present disclosure seeks to provide an improved method for determining an action performed by an object within an input image.

Moreover, the disclosure seeks to provide a software product recorded on machine-readable non-transient data storage media, wherein the software product is executable upon computing hardware to implement the aforementioned method for determining an action performed by an object within an input image.

According to a first aspect, an embodiment of the present disclosure provides a system for determining an action performed by an object within an input image. The system includes a memory to store one or more instructions, and a processor communicatively coupled to the memory, and configured to execute the one or more instructions in the memory, wherein the processor employs a convolutional neural network (CNN). The CNN includes a predefined number of initial stages for extracting one or more significant features corresponding to the input image, wherein each initial stage includes a first layer, and a residual block, and wherein the first layer is selected from a group consisting of a convolution layer, a max pooling layer, and an average pooling layer. The CNN includes a final stage for classifying the extracted significant features into one or more predefined classes, wherein the final stage is formed of a global average pooling layer, and a dense layer.

According to a second aspect, an embodiment of the present disclosure provides a method for determining an action performed by an object within an input image. The method includes receiving the input image, and providing the input image to a convolutional neural network (CNN). The CNN includes a predefined number of initial stages for extracting one or more significant features corresponding to the input image, wherein each initial stage includes a first layer, and a residual block, and wherein the first layer is selected from a group consisting of a convolution layer, a max pooling layer, and an average pooling layer. The CNN includes a final stage for classifying the extracted significant features into one or more predefined classes, wherein the final stage is formed of a global average pooling layer, and a dense layer.

According to a third aspect, an embodiment of the present disclosure provides a software product recorded on machine-readable non-transient data storage media, wherein the software product is executable upon computing hardware to implement the aforesaid method for determining an action performed by an object within an input image.

The present disclosure seeks to provide the system and the method for determination of actions performed by objects within images by using the convolutional neural network, wherein the convolutional neural network employs a limited number of layers, constant number of filters and downsizing of the images, thereby, improving a speed, accuracy and reliability associated with the determination of actions performed by objects within the images.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings.

However, the present disclosure is not limited to specific methods and instrumentalities disclosed herein. Moreover, those in the art will understand that the drawings are not to scale. Wherever possible, like elements have been indicated by identical numbers.

Figure 1:
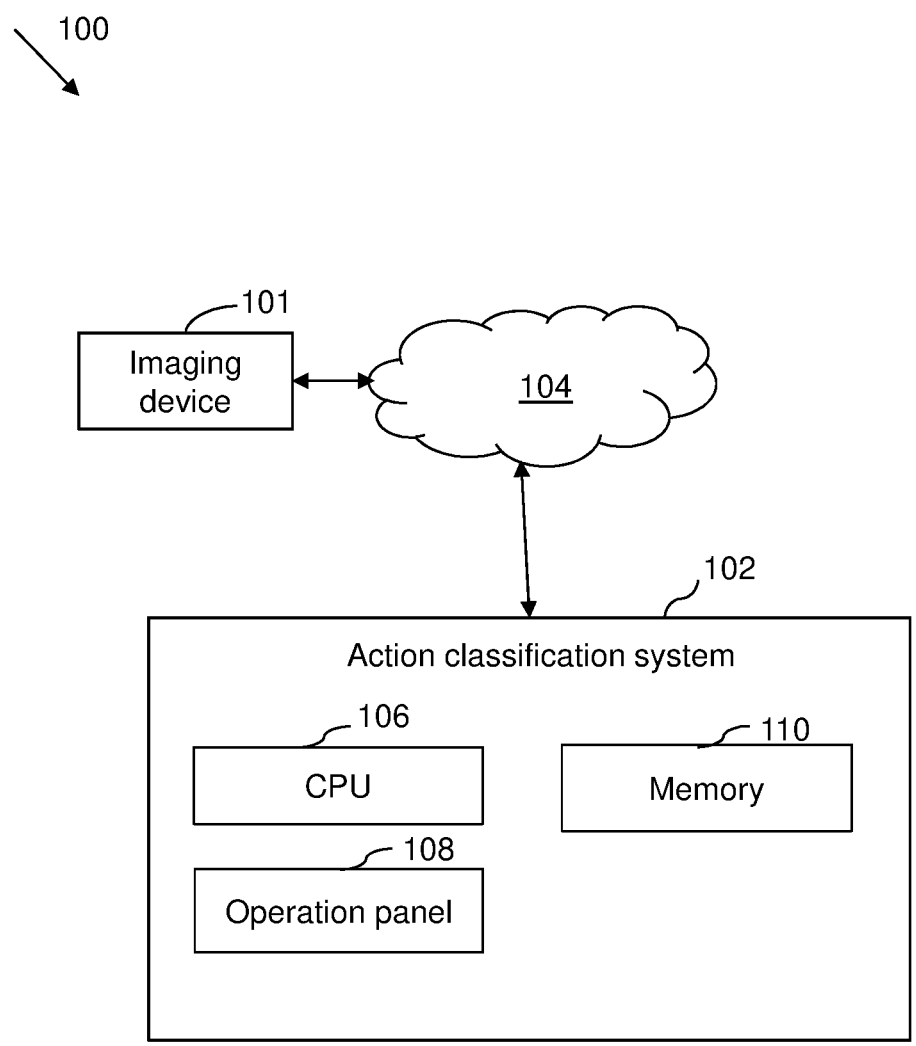
Figure 2A:
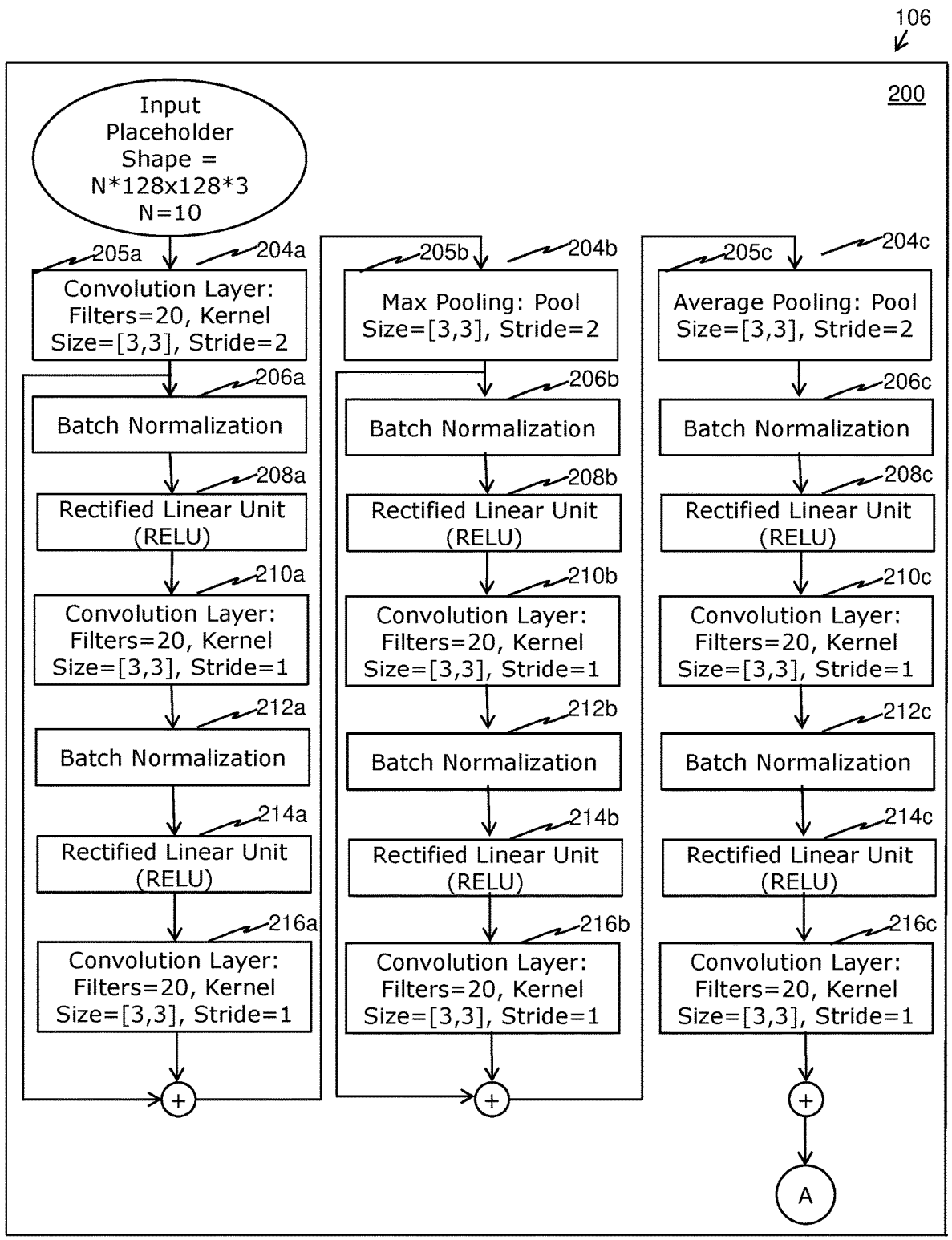
Figure 2B:
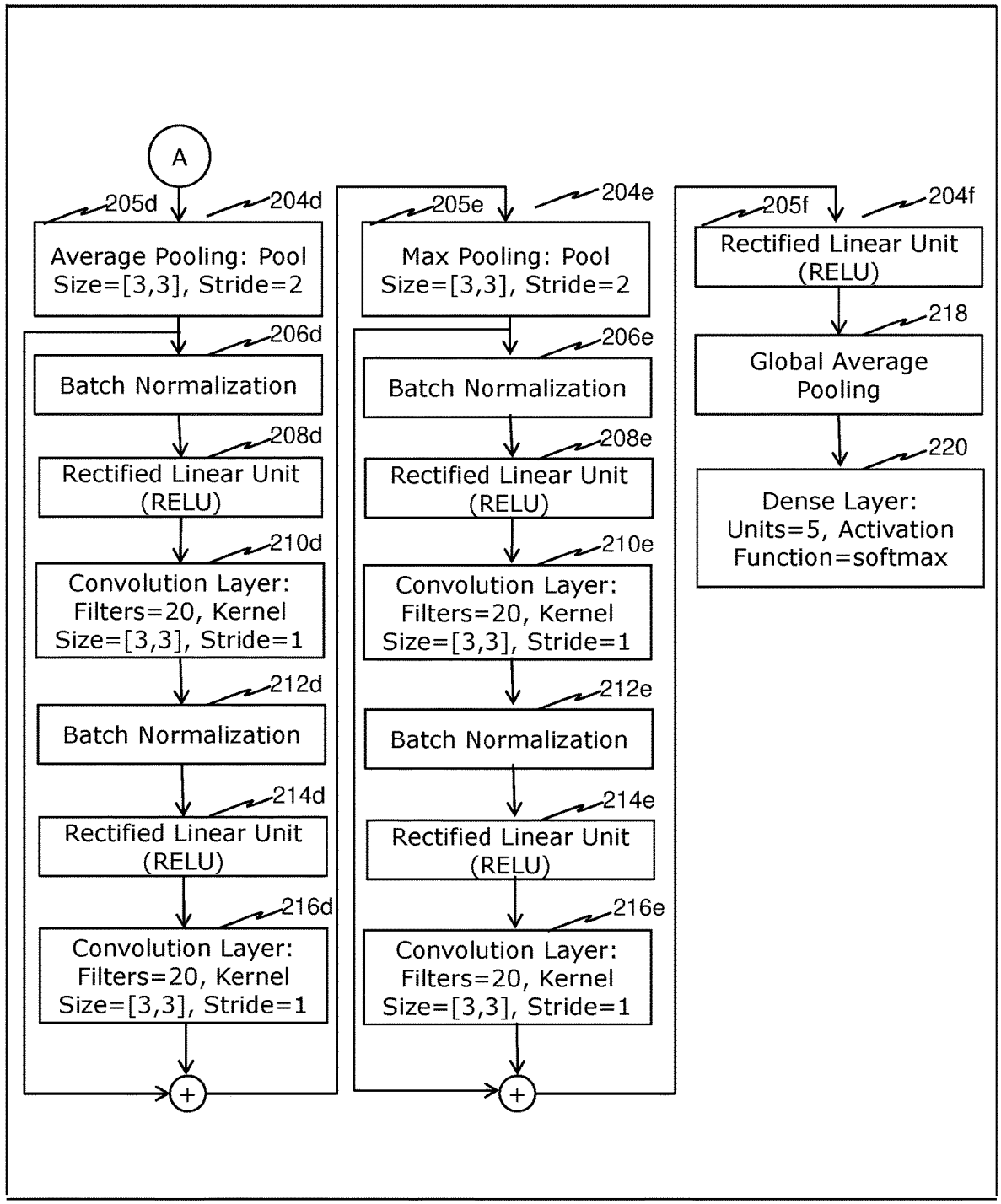
Figure 3:
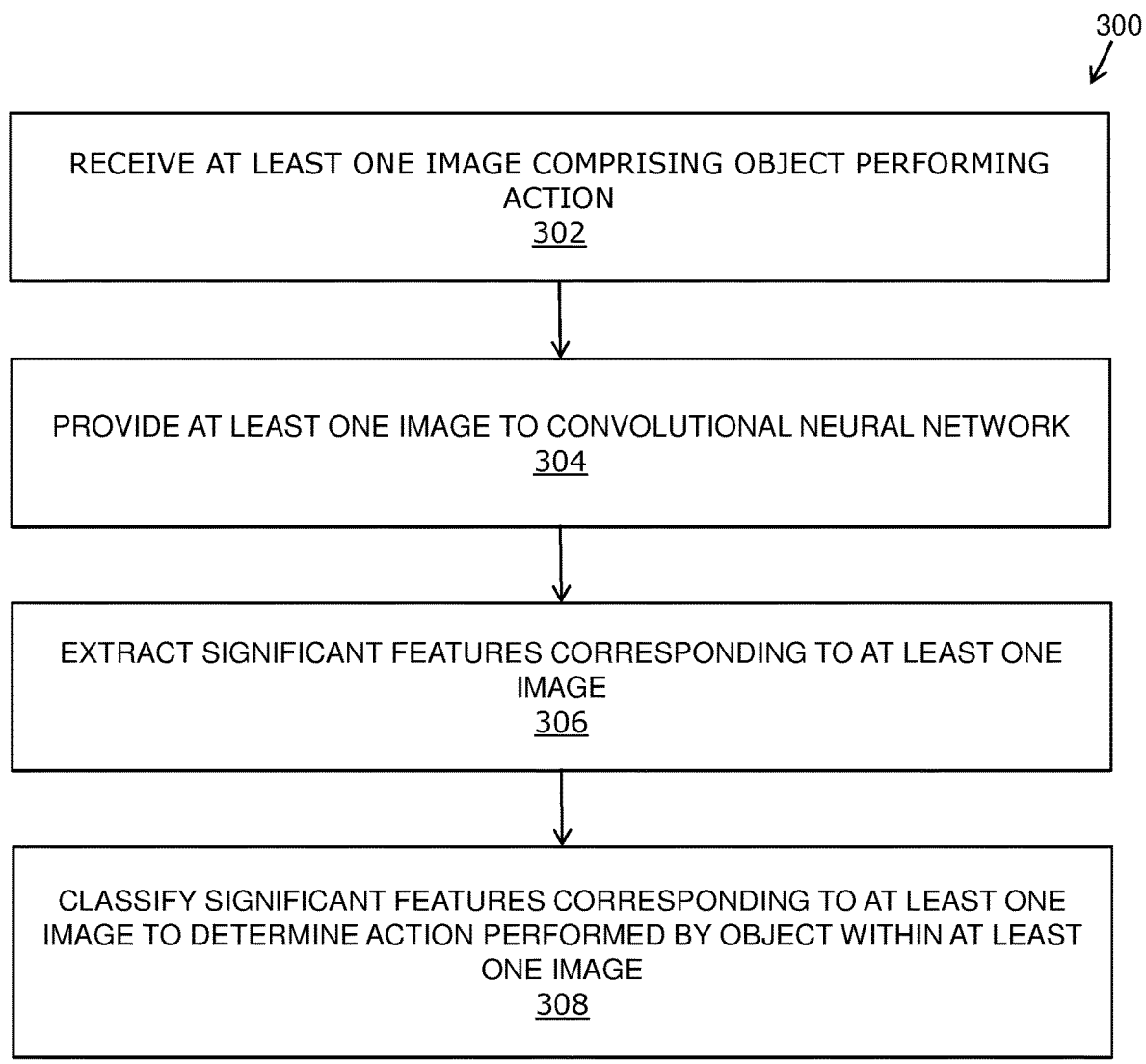

Embodiments of the present disclosure will now be described, by way of example only, with reference to the following diagrams wherein:

FIG. 1 illustrates an environment, wherein various embodiments of the present disclosure can be practiced;

FIGS. 2A and 2B illustrates a Convolutional Neural Network (CNN) for determining an action performed by an object within at least one image, in accordance with an embodiment of the present disclosure; and FIG. 3 is an illustration of steps of a method of determining an action performed by an object within at least one image, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In overview, embodiments of the present disclosure are concerned with systems and methods for determining actions performed by objects within images.

FIG. 1 illustrates an environment 100, wherein various embodiments of the present disclosure can be practiced. The environment 100 includes an imaging device 101, and an action classification system 102, communicatively coupled to each other through a communication network 104. The communication network 104 may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

The imaging device 101 is configured to capture a video stream. In an embodiment of the present disclosure, the imaging device 101 is configured to capture one or more images of a retail check out process including a Self-check out system (SCO). Optionally, the imaging device 101 includes, but not limited to, an Internet protocol (IP) camera, a Pan-Tilt-Zoom (PTZ) camera, a thermal image camera or an Infrared camera.

The action classification system 102 is configured to classify images of human actions and human activities captured by the imaging device 101 in one or more predefined classes.

The action classification system 102 includes a central processing unit (CPU) 106, an operation panel 108, and a memory 110. The CPU 106 is a processor, computer, microcontroller, or other circuitry that controls the operations of various components such as the operation panel 108, and the memory 110. The CPU 106 may execute software, firmware, and/or other instructions, for example, that are stored on a volatile or non-volatile memory, such as the memory 110, or otherwise provided to the CPU 106. The CPU 106 may be connected to the operation panel 108, and the memory 110, through wired or wireless connections, such as one or more system buses, cables, or other interfaces. In an embodiment of the present disclosure, the CPU 106 may include a custom Graphic processing unit (GPU) server software to provide real-time object detection and prediction, for all cameras on a local network.

The operation panel 108 may be a user interface for the action classification system 102, and may take the form of a physical keypad or touchscreen. The operation panel 108 may receive inputs from one or more users relating to selected functions, preferences, and/or authentication, and may provide and/or receive inputs visually and/or audibly.

The memory 110, in addition to storing instructions and/or data for use by the CPU 106 in managing operation of the action classification system 102, may also include user information associated with one or more users of the action classification system 102. For example, the user information may include authentication information (e.g. username/password pairs), user preferences, and other user-specific information. The CPU 106 may access this data to assist in providing control functions (e.g. transmitting and/or receiving one or more control signals) related to operation of the operation panel 108, and the memory 110.

FIGS. 2A-2B illustrates a block diagram of the CPU 106 of the action classification system 102, in accordance with an embodiment of the present disclosure.

The CPU 106 employs a Convolutional Neural Network (CNN) 200 that is operable to analyze each frame of the video stream to determine at least one action region of interest, wherein the at least one region of interest comprise at least one object. In an example, the at least one object may be a person, objects such as clothing items, groceries, wallet and so forth, and one or more actions may include a person taking out wallet from its pocket, the person walking in a queue, the person swiping a credit card, and the like. The CNN 200 may be trained to classify an image frame of the video of the SCO scan area (scanning action region of interest) in classes such as hand, object in hand, object, body part, empty scanner. The criteria for classification of an image frame in each class has been mentioned below:

Hand—The image frame shows human hand(s).

Object in hand—The image frame shows an object in a hand of the user.

Object—The image frame shows only object

Body part—The image frame shows a human body part

Empty scanner—The image frame shows only the empty scanner

In an embodiment of the present disclosure, the CNN 200 is formed of first through sixth stages 204a till 204f (hereinafter collectively referred to as stages 204). The CNN 200 refers to a neural network which is partly composed of convolutional layers, i.e. layers which apply a convolution on their input. Further, it would be apparent to one of ordinary skill in the art that the number of stages in the CNN 200 may be more than six. The CNN 200 as referred herein is defined as trained deep artificial neural network that is used primarily to classify the at least one object in the at least one region of interest. Notably, they are algorithms that can identify faces, individuals, street signs, and the like. The term "neural network" as used herein can include a highly interconnected network of processing elements, each optionally associated with a local memory. Furthermore, the processing elements of the neural networks can be "artificial neural units", "artificial neurons," "neural units," "neurons," "nodes," and the like. Moreover, the neuron can receive data from an input or one or more other neurons, process the data, and send processed data to an output or yet one or more other neurons.

In an embodiment of the present disclosure, each stage 204 of the CNN 200 is composed of several layers. In an example, each stage 204 includes a first layer selected from a group consisting of a convolution layer, a max pooling layer, and an average pooling layer. The max and average pooling layers are configured to down sample corresponding input, which then reduces the size of the next layers. For each stage 204, layers other than the first layer form a corresponding residual block.

In an embodiment of the present disclosure, the first stage 204a includes a convolution layer 205a and a first residual block including a batch normalization layer 206a, a rectified linear unit (RELU) layer 208a, another convolution layer 210a, a batch normalization layer 212a, another RELU layer 214a, and yet another convolution layer 216a. The layers of remaining second to fifth stages 204b till 204e are self-explanatory with respect to FIGS. 2A and 2B, and need not be explained herein again for the sake of brevity.

In the CNN 200, each convolutional layer refers to groups of convolving kernels used to find distinctive local features to support the classification task. In traditional image processing pipeline, convolutional kernels are handcrafted to obtain response maps from the original image as the feature extraction step. For examples, the Sobel kernel or Prewitt kernel are used to extract edge information, whereas a Gaussian smoothing kernel is used to obtain a noise-reduced blurred image. In the CNN pipelines, the convolution kernels are initialized randomly and evolved to learn saliency in order to improve the ultimate classification performance. Stacks of feature maps are calculated by convolution operations across layers and kernels. Each convolutional layer 204a, 210a and 216a employs a stride value of 1.

Further in the CNN 200, each of the max pooling layers 205b and 205e employs a non-linear function to down-sample the feature map generated by a corresponding previous convolution layer. In the context of the CNN 200, the max-pooling thins the CNN 200 and is used instead of convolution (by extracting the most significant pixels and working as a form of regularization). The regularizing comprises extracting a plurality of pixels having a high significance for determining the action performed by the object within at least one image.

Furthermore in the CNN 200, each of the average pooling layer 205c and 205d is used to encode the information in a condensed form. In an example, the average pooling layers 205c and 205d performs down-sampling by dividing the input into rectangular pooling regions and computing the average values of the plurality of pixels having a high significance.

Furthermore in the CNN 200, each of the batch normalization layers 206a till 206e normalizes the output of a previous activation layer by subtracting the batch mean and dividing by the batch standard deviation.

Furthermore in the CNN 200, each of the RELUs 214a to 214e refer to a collections of computing programs or routines for using activation function, and that are analogous to half-wave rectification obtained using the significant features corresponding to the at least one image.

In operation, the first through fifth stages 204a till 204e are configured to extract significant features from an input image. The term "significant features" as used herein refers to the one or more changes in the pixel characteristics in the at least one input image. The term "pixel characteristics" as used with reference to each pixel, refers to a size of a pixel, a color of the pixel and/or a resolution of the pixel. Specifically, features extraction process is repetitively performed till a desired set of features are extracted from the at least one image.

In an embodiment of the present disclosure, the sixth stage 204f is the classification stage which makes the actual decision based on the output (features) of previous first through fifth stages 204a till 204e. The sixth stage 204f employs a global average pooling layer 218 and a dense layer 220, to determine the action performed by the object within the at least one image. The global average pooling layer 218 is used to reduce the spatial dimensions of a three-dimensional tensor, and the dense layer 220 includes linear operation in which every input is connected to every output by a weight (so there are n_inputs*n_outputs weights). The dense layer 220 is a common feature of the CNN 200, where each neuron is fully connected to all neurons in a corresponding previous layer. The global average pooling layer 218 employs a non-linear function to perform down-sampling. In an example, the sixth stage 204f classifies an input image in one of the following five classes: Hand, Hand+Object, Object, Bodypart, Empty Scanner.

In various embodiments of the present disclosure, the CNN 200 employs constant number of filters throughout in its convolutional layers, and uses residual blocks that include convolution layers that only use stride 1 which allows the CNN 200 to skip some residual blocks. The CNN 200 leverages a dimensionality reduction mechanism by periodically applying max/average pooling layers and keeping the number of filters constant over all the layers. A common practice would be to double the number of filters after each dimensionality reduction operation, but by having a constant value, the width of the network can act as a training hyper-parameter.

The CNN 200 has very thin layers and is overall light-weight (140000 trainable parameters) and can perform almost as good as any other fine tuned custom architecture based on ResNet or DenseNet (17000000-58000000 trainable parameters) on the task of classifying images of 5 classes (Hand, Hand+Object, Object, Bodypart, Empty Scanner) on 128×128 color images. The advantage comes in the form of a low memory footprint (roughly 450 mb) and inference times 3 to 5 times faster than other systems.

The CNN 200 leverages following two key principles:

Full Pre-activation residual blocks with two convolutional layers, which includes identity mappings in deep residual networks Super-Convergence, which includes very fast training of neural networks using large learning rates Referring to FIG. 3, there are shown steps of a method 300 of determining an action performed by an object within at least one image, in accordance with an embodiment of the present disclosure. At a step 302, the at least one image comprising the object performing the action is received. At a step 304, the at least one image to a convolutional neural network is provided. At a step 306, significant features corresponding to the at least one image are extracted by employing: a convolution layer, a max pooling layer, and an average pooling layer associated with the convolutional neural network. At a step 308, the significant features corresponding to the at least one image are classified by employing: a global average pooling layer and a dense layer, to determine the action performed by the object within the at least one image.

The steps 302 to 308 are only illustrative and other alternatives can also be provided where one or more steps are added, one or more steps are removed, or one or more steps are provided in a different sequence without departing from the scope of the claims herein. In an example, the method includes iteratively extracting the significant features corresponding to the at least one image by employing a plurality of: convolution layers, max pooling layers, and average pooling layers associated with the convolutional neural network. In another example, the method includes employing at least one residual block comprising a batch normalization layer and a rectified linear unit, after extracting the significant features. In another example, the max pooling layer, average pooling layer or global average pooling layer employs a non-linear function to perform down-sampling of the at least one image. In yet another example, the method includes regularizing the at least one image by employing the max pooling layer, wherein the regularizing comprises extracting a plurality of pixels having a high significance for determining the action performed by the object within at least one image. In an example, the method includes employing the average pooling layer to encode information within the at least one image in a condensed form. In another example, the method includes each layer comprises a plurality of artificial neurons, and wherein each of the plurality of artificial neurons of the dense layer is connected with the plurality of artificial neurons of the global average pooling layer. In yet another example, the method includes employs a stride value of 1 by the convolutional layer.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein is merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A system for determining an action performed within an input image, the system comprising:
    a memory to store one or more instructions; and
    a processor communicatively coupled to the memory, and configured to execute the one or more instructions in the memory, wherein the processor employs a convolutional neural network (CNN) that comprises:
        a predefined number of initial stages for extracting one or more significant features corresponding to the input image, wherein each initial stage includes a first layer, and a residual block, and wherein the first layer is selected from a group consisting of: a convolution layer, a max pooling layer, and an average pooling layer, wherein the max pooling layer is configured for extracting a plurality of pixels that has a high significance for determining the action performed by the object within the input image; and
        a final stage for classifying the extracted significant features into one or more predefined classes, wherein the final stage is formed of a global average pooling layer, and a dense layer;
        wherein each of the max pooling layer, the average pooling layer and the global average pooling layer employing a non-linear function to perform down-sampling of corresponding input.

2. The system as claimed in claim 1, wherein the predefined number of initial stages are configured to iteratively extract the significant features corresponding to the input image.

3. The system as claimed in claim 1, wherein the each residual block comprises at least one batch normalization layer, at least one rectified linear unit, and at least one convolution layer of a constant number of filters.

4. The system as claimed in claim 1, wherein the input image comprises in a range of 1 to 30 images.

5. The system as claimed in claim 1, wherein the average pooling layer is configured to encode information within the input image in a condensed form.

6. The system as claimed in claim 1, wherein each layer comprises a plurality of artificial neurons, and wherein each artificial neuron of the dense layer is connected with each artificial neuron of the global average pooling layer.

7. The system as claimed in claim 1, wherein each convolutional layer employs a stride value of 1 and a constant number of filters.

8. A method for determining an action performed by an object within an input image, the method comprising:
    receiving the input image; and
    providing the input image to a convolutional neural network (CNN), wherein the CNN comprises:
        a predefined number of initial stages for extracting one or more significant features corresponding to the input image, wherein each initial stage includes a first layer, and a residual block, and wherein the first layer is selected from a group consisting of: a convolution layer, a max pooling layer, and an average pooling layer, wherein the max pooling layer is configured for extracting a plurality of pixels that has a high significance for determining the action performed by the object within the input image; and a final stage for classifying the extracted significant features into one or more predefined classes, wherein the final stage is formed of a global average pooling layer, and a dense layer;

wherein each of the max pooling layer, the average pooling layer and the global average pooling layer employing a non-linear function to perform down-sampling of corresponding input.

9. The method as claimed in claim 8, further comprising iteratively extracting the one or more significant features corresponding to the input image.

10. The method as claimed in claim 8, wherein the each residual block comprises at least one batch normalization layer, at least one rectified linear unit, and at least one convolution layer of a constant number of filters.

11. The method as claimed in claim 8, wherein the at least one image comprises in a range of 1 to 30 images.

12. The method as claimed in claim 8, further comprising employing the average pooling layer to encode information within the input image in a condensed form.

13. The method as claimed in claim 8, wherein each layer comprises a plurality of artificial neurons, and wherein each artificial neuron of the dense layer is connected with each artificial neuron of the global average pooling layer.

14. The method as claimed in claim 8, wherein the convolutional layer employs a stride value of 1 and a constant number of filters.

15. A software product recorded on machine-readable non-transient data storage media, wherein the software product is executable upon computing hardware to implement the method as claimed in claim 8.

* * * * *